UNITED STATES PATENT OFFICE.

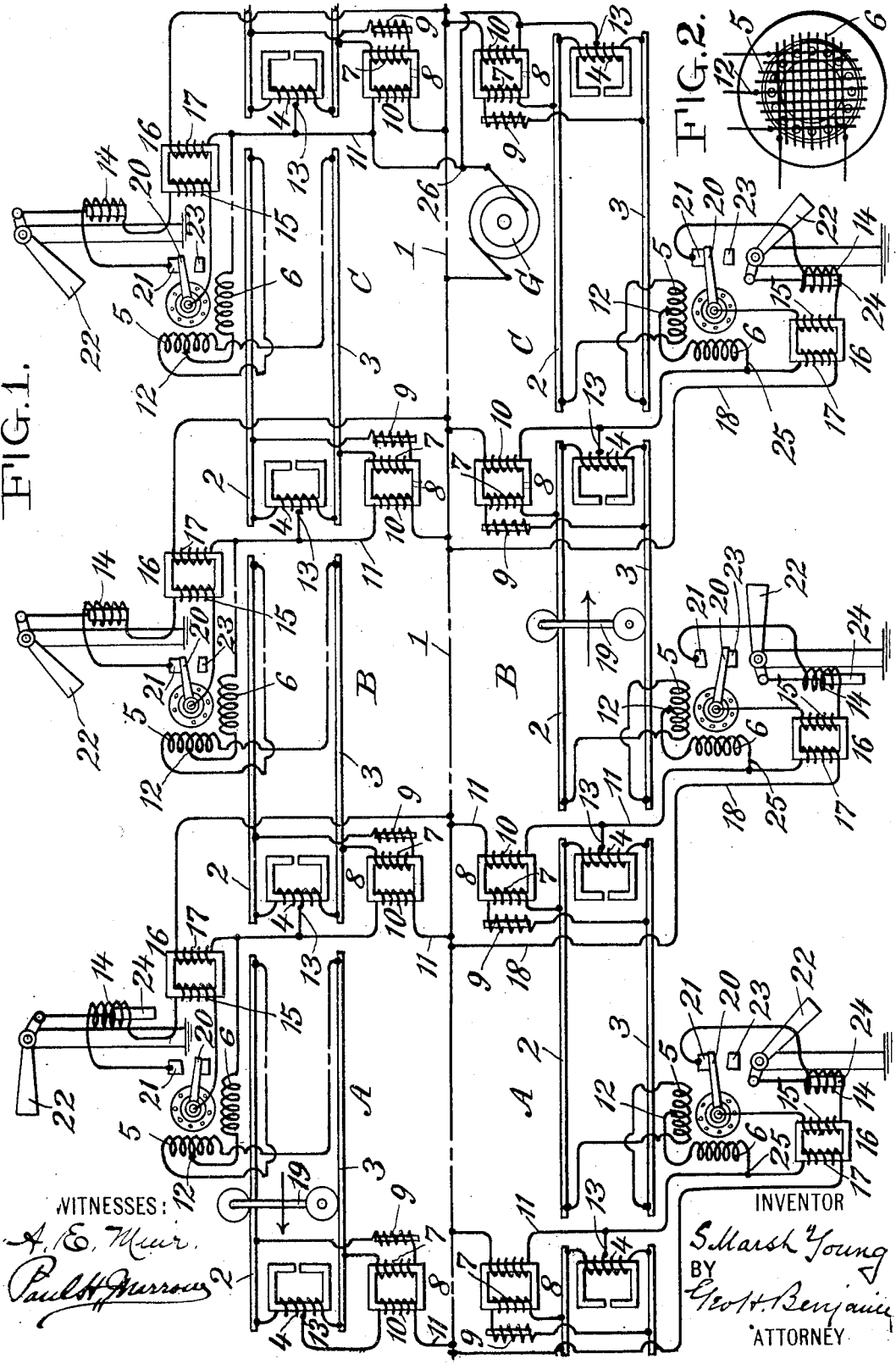

SAMUEL MARSH YOUNG, OF NEW YORK, N. Y.

SYSTEM OF AUTOMATIC BLOCK SIGNALING FOR RAILWAYS.

No. 876,419.  Specification of Letters Patent.  Patented Jan. 14, 1908

Application filed November 1, 1907. Serial No. 400,257.

*To all whom it may concern:*

Be it known that I, SAMUEL MARSH YOUNG, a citizen of the United States, residing at New York city, county and State of New York, have invented a System of Automatic Block Signaling for Railways, of which the following is a specification.

My invention relates to improvements in systems of automatic block signaling for railways operated by steam or other motive power, in which the trackway is divided into block sections, the traffic-rails constituting conductors in the signaling circuit.

Great difficulty has been experienced in the operation of the automatic signaling systems heretofore employed upon steam railroads due to the stray currents from electric roads in the immediate vicinity interfering with the battery track circuits, and it is the purpose of my invention to provide a method of signaling which will be absolutely proof against interference from such stray currents.

It has heretofore been proposed to energize the track circuits and to operate the ordinary relay magnets by means of an alternating current, using an earth return for the signaling current. It has also been proposed to connect the rails by means of inductive cross-bonds for the purpose of utilizing the rails as a return for the power current of electric railways.

In my present invention I employ inductive cross-bonds to connect the rails of each block section and electrically connect the neutral points of the cross-bonds of adjacent sections in order that I may utilize the individual rails in the separate track circuits and the combined rails as a continuous return for the signaling current. I may, therefore, connect any number of tracks in the return circuit to the generator, and operate the signals of the whole system from a single supply conductor. Furthermore, I employ signal relays which are strictly selective and hence are not liable to interference from currents employed in neighboring electric railways.

My invention will be more readily understood by reference to the accompanying drawings.

Figure 1 is a diagram showing my system applied to a two track railway. Fig. 2 is an enlarged end view of the relay motor showing the conventional arrangement of stator coils, one of which is provided with an additional tap at its center, and inclosing a rotor of the squirrel-cage type.

In the drawings, G indicates a source of alternating current connected to the main supply conductor 1, and to the rails 2, 3, of the two trackways through the inductive cross-bonds 4, 4.

The track rails of each block are electrically connected at one end by an inductive bond 4, and at the other end by a relay bond comprising the stator coil 5, of the signal relay which is connected across the rails. An alternating electromotive force is impressed upon the track rails 2, 3, of each block by connecting the rails respectively with the terminals of the secondary coil 7 of a transformer 8, a reactance, indicated by the choking coil 9, being included in the circuit for the purpose of dephasing the current in the track circuit, and which also serves to prevent a complete short circuit of the secondary coil 7 when a car is on the section. The primary coil 10 of each transformer is in circuit with a branch conductor 11, connected with one terminal of the relay coil 6, the other terminal of which is connected to the middle point 12 of the coil 5. The current through the conductor 11 thus energizes the primary windings 10 of transformer 8, and the coil 6 of the relay, passing through the relay bond 5 in both directions to the rails 2, 3, thence returning through the several track sections and the connecting bonds to the generator. Each conductor 11 is also connected at 13 with the middle point of the cross-bond 4 of the preceding section, the portion between the points 12 and 13, constituting a part of the track return for the main signaling or primary current. It will be observed that this current has no magnetizing effect upon the bonds 4, or relay bonds 5.

In my present invention I energize the magnet connected with the signal-arm by means of a branch circuit from the main supply lead 1. I have shown the signal-arm magnet 14, connected in circuit with the secondary winding 15 of a transformer 16, the primary winding 17 of which is connected to a branch conductor 18 and at 25, to the track return. For the purpose of explaining the principle of my invention in a simple form, I have merely shown the home signals at each block, and a relay controlling its local circuit, but it is to be understood that I intend to include the use of the usual distant signals and that the relay is intended to perform the functions well known in the art, by means of its inherent several positions, such as controlling the local and distant signals, overlaps, etc., and that it may be used either with the normal clear or the normal danger system.

The operation of my system is as follows: Referring for illustration to the lower trackway shown in the drawing it will be seen that the vehicle 19 occupies the center block. The relays in the unoccupied blocks A and C will have their rotor arms 20 held against the contacts 21, due to the rotary magnetic field produced by the joint action of the currents flowing in the coils 5 and 6. The currents in the relay coils are in displaced relation, thus constituting the relay a polyphase motor, the stator coil 6 being energized by the primary current flowing through the branch conductor 11, while the coil 5 is energized by the secondary current flowing in the secondary winding 7 of transformer 8 and displaced in phase by passing through the reactance device 9, so that there may be a difference in phase between the currents in the two relay coils of substantially 90 degrees. It will be observed, therefore, that the track rails 2, 3, separately transmit the secondary current of the local track circuit and jointly transmit the primary signaling current of the track return, the two currents being displaced in phase. With the relay-arms in the position shown in blocks A and C, the local secondary circuit of the transformer 16 is closed and the signal arm 22 is held in normal clear position.

When a car enters a section as in block B, the secondary current of transformer 8, constituting the current of the local track-circuit, is short-circuited and the winding 5 of the relay is deënergized, the rotor-arm 20 moving by gravity or other force to the stop 23, opening the local circuit through the magnet 14, and causing the signal-arm 22 to be raised by the weight of the core 24, to the danger position. The primary signaling current, however, which flows from the main supply lead 1, through the several branch conductors 11, and 18, to energize the transformers 8 and 16, and the relay coils 6, passing differentially through the other relay coil 5 serving as an inductive bond, to the rails 2, 3, is unaffected by the entrance of a car upon the block, since the rails jointly constitute the return conductor. After the primary signaling current thus enters the rails of any section, the current flows through the rails to the end of the section, passes differentially through the winding of the cross-bond 4 then by way of lead 11, through relay coil 6, and differentially through the relay bond coil 5 to the rails and so on to the terminus of the trackway where the several terminal cross-bonds of the tracks of the system unite as at 26 and are connected to the generator terminal.

Having thus described my invention what I claim is—

1. A signaling system for a trackway having a plurality of pairs of tracks divided into block sections and having a single source of energy for the signals and controlling mechanism, in which the traffic-rails of each section constitute separate conductors for the track circuits and a joint track return for the signaling current.

2. A signaling system for a trackway having a plurality of pairs of tracks divided into block sections and having a single conductor supplying energy for the signals and controlling mechanism for the system, in which the traffic-rails of each section constitute separate conductors for the track circuits and a joint conductor for the return signaling current.

3. In a signaling system, the combination of a trackway divided into sections, signals indicating the location of the vehicles, relays for controlling said signals operatively connected with the rails of each section, a generator having a single conductor supplying current to energize said signals and said relays, and means whereby the rails of each section separately convey the current controlling the operation of said relays and jointly convey the current returning to said generator.

4. In a signaling system, the combination of a trackway divided into sections, cross-bonding conductors between the track-rails, signals indicating the location of the vehicles, local track-circuits controlling the operation of the signal-relays, a generator having a single conductor supplying current to energize said signals and said track-circuits, and means whereby said current is returned to the generator through both rails of the several sections.

5. In a signaling system, the combination of a trackway divided into sections, a single conductor for supplying the signaling current to said sections, reactive cross-bonds between the rails at each end of each track section, track-circuits controlling the operation of the signal relays, branch conductors connected to said supply conductors and to the middle of said cross-bonds, and transformers in said branch conductors whose secondary coils supply current respectively to the signals and to the track-circuits.

6. In a signaling system for a trackway divided into block sections, having signals indicating the location of the vehicles, a selective relay controlling the signals of each section, having a winding connected between the traffic-rails constituting a relay-bond for the track-circuit, and a winding connected to the middle of said relay-bond and to the primary coil of a transformer whose secondary coil is connected across said track-circuit.

7. In a signaling system, the combination of a trackway divided into sections, a single conductor for supplying an alternating current to energize the signal mechanism of each section and the controlling relays therefor, means for jointly connecting both rails of each section directly with said conductor, and means for inductively connecting said rails individually with said conductor.

8. In a signaling system, the combination of a trackway divided into sections, a single conductor for supplying an alternating current to energize the signals, controlling relays therefor having a plurality of windings, means for jointly connecting the rails of each section directly with said supply conductor, means for inductively connecting said rails individually with said conductor through a reactive device, and means for including the relay windings respectively in the circuits of said direct and inductive connections.

9. A signaling system for a trackway divided into block sections, comprising an alternating current generator having a single conductor supplying the signaling current, and transformers having secondary coils connected to the track circuits and primary coils located in branch leads connecting the supply conductor with the middle points of the cross-bonds, reactive cross-bonds connected to the traffic-rails at the ends of the sections, whereby the rails serve separately as the conductors of the track circuits and jointly as the track return for the signaling current.

10. A signaling system for a trackway divided into block sections, comprising an alternating current generator having a single conductor supplying the signaling current, transformers having secondary coils connected to the track circuits and primary coils located in branch leads connecting the supply conductor with the middle points of the cross-bonds, reactive cross bonds connected to the traffic-rails at the ends of the sections, whereby the rails serve separately as the conductors of the track circuits and jointly as the track-return for the signaling current, and relays having one coil in said primary branch lead and another coil constituted by one of said cross-bonds.

11. In a signaling system of the type described, an alternating current generator having a single conductor for supplying the signaling current to the system, reactive cross-bonds between the track rails of each block section, a selective relay for each section having a winding connected in the local track circuit, and a winding connected in a branch circuit connected between said supply conductor and the middle of said other relay winding.

12. In a signaling system for a trackway divided into block sections, an alternating current generator having a single conductor for supplying the signaling current to the system, signal mechanism inductively connected to said conductor, and relays controlling the operation of said signals having one winding inductively connected with said conductor and another winding connected directly therewith and with both traffic-rails, the latter serving as a return for the signaling current.

13. In a signaling system for a trackway divided into block sections, an alternating-current generator having a single conductor for supplying the signaling current to the system, transformers for each section having secondary coils connected respectively with the signal operating magnets and with the local track circuit, a relay controlling the signals having one coil connected between the track rails, constituting a relay-bond, and another coil connected to the middle of said first-named coil and to branch leads connecting the primary windings of said transformers with said supply conductor.

14. In a signaling system for a trackway divided into block sections, an alternating current generator having a single conductor for supplying the signaling current to the system, reactive cross-bonds connecting the rails at one end of each section, a relay having a winding connecting the rails at the other end of each section and a second winding connected to the middle of the first winding, transformers having their secondary coils connected respectively with the track rails and with the circuit of the signal magnet, and their primary coils in branch circuits connecting said second relay winding with the supply conductor, one of said branch circuits being connected to the middle of the cross-bond of the adjacent section.

In testimony whereof, I affix my signature, in the presence of two witnesses.

SAMUEL MARSH YOUNG.

Witnesses:
M. TURNER,
A. E. MUIR.